United States Patent
Soshi et al.

(10) Patent No.: US 9,221,140 B2
(45) Date of Patent: Dec. 29, 2015

(54) METHOD OF MACHINING WORKPIECE WITH MACHINE TOOL

(71) Applicants: MORI SEIKI CO., LTD., Nara (JP); INTELLIGENT MANUFACTURING SYSTEMS INTERNATIONAL, San Francisco, CA (US)

(72) Inventors: Masakazu Soshi, Nara (JP); Shinji Ishii, Nara (JP); Kazuo Yamazaki, El Macero, CA (US)

(73) Assignees: DMG MORI SEIKI CO., LTD., Yamatokoriyama-Shi, Nara (JP); INTELLIGENT MANUFACUTRING SYSTEMS INTERNATIONAL, San Francisco, CA (US)

( * ) Notice: Subject to any disclaimer, the term of this patent is extended or adjusted under 35 U.S.C. 154(b) by 30 days.

(21) Appl. No.: 13/900,048

(22) Filed: May 22, 2013

(65) Prior Publication Data
US 2013/0322977 A1 Dec. 5, 2013

(30) Foreign Application Priority Data
Jun. 1, 2012 (JP) .................................. 2012-126096

(51) Int. Cl.
G05B 11/01 (2006.01)
B23Q 5/54 (2006.01)
G05B 11/42 (2006.01)
G05B 19/416 (2006.01)

(52) U.S. Cl.
CPC ........ *B23Q 5/54* (2013.01); *G05B 11/42* (2013.01); *G05B 19/4163* (2013.01); *G05B 2219/43132* (2013.01); *Y10T 409/303808* (2015.01)

(58) Field of Classification Search
USPC .................................................. 318/400, 560
See application file for complete search history.

(56) References Cited

U.S. PATENT DOCUMENTS

| | | | | |
|---|---|---|---|---|
| 3,571,834 A | * | 3/1971 | Mathias | 408/9 |
| 4,849,741 A | * | 7/1989 | Thomas | 340/683 |
| 6,283,687 B1 | * | 9/2001 | Santorius et al. | 409/132 |
| 6,445,980 B1 | * | 9/2002 | Vyers | 700/282 |
| 6,961,637 B2 | * | 11/2005 | Scherer | 700/173 |

FOREIGN PATENT DOCUMENTS

| | | | | |
|---|---|---|---|---|
| JP | 2002059342 A | * | 2/2002 | B23Q 17/20 |
| JP | 2003-170333 A | | 6/2003 | |

* cited by examiner

*Primary Examiner* — Kawing Chan
(74) *Attorney, Agent, or Firm* — Miller, Matthias & Hull LLP

(57) ABSTRACT

A workpiece is machined by setting a frequency response band of a control system for a rotation drive motor or a feed drive motor so that tool abrasion is within a predetermined allowable range. The frequency response band may be adjusted by adjusting a proportional gain and an integral gain. With the workpiece machined by such a process, where the frequency response band maintains tool abrasion within the allowable range, machining quality and efficiency are improved.

4 Claims, 11 Drawing Sheets

METHOD OF MACHINING WORKPIECE WITH MACHINE TOOL

TECHNICAL FIELD

The present disclosure relates to methods of machining a workpiece with a machine tool and, more specifically, to machining methods capable of reducing tool wear even in intermittent cutting.

BACKGROUND OF THE DISCLOSURE

In general, machine tool damage (such as wear and defects) are thought to depend on the material and shape of the tool, the magnitude of cutting resistance to be acted on the tool in cutting, and other factors. When the tool is damaged quickly, that is the tool life is short, machining quality is disadvantageously unstabilized. Moreover, the tool is required to be exchanged often, thereby disadvantageously degrading machining efficiency.

Thus, conventionally, cutting tools with high wear resistance have been diligently and continuously developed, in view of structural stiffness in addition to their material and shape. Also, machine tools have been improved everyday to stabilize a machining environment, such as stiffness, based on the machine tools in order to achieve stable machining. Furthermore, regarding a machining method, as disclosed in the Japanese Unexamined Patent Application Publication No. 2003-170333, an attempt has been made to reduce wear and damage of a tool by decreasing fluctuations in cutting resistance during machining.

Incidentally, in the machining method disclosed in the Japanese Unexamined Patent Application Publication No. 2003-170333, a feed path of the tool capable of reducing fluctuations in cutting resistance during machining is generated, and the tool is moved along the path, thereby reducing wear and damages. Specifically, this feed path is generated by providing a geometrical restriction on each of two geometrical variables, that is, a maximum chip thickness before cutting and a cutting arc length of a tool interference part, so that these geometric variables each have a constant value at each part of the feed path irrespective of the location, the geometric variables being represented by a projected portion obtained when an interfering part between a workpiece and an end mill tool occurring due to a motion of a unit amount of the end mill tool is projected onto a machining plane along a rotation axis.

SUMMARY OF THE DISCLOSURE

Technical Problem

Meanwhile, fluctuations in cutting resistance inevitably occur in the case of machining with a tool with a discontinuous cutting blade such as an end mill or a face mill, as in machining in a machining center, for example, because of so-called intermittent cutting. Also in a turning process, for example, if a groove or a hole is formed in a surface to be machined, intermittent cutting occurs when this groove or hole is machined. Therefore, fluctuations occur in cutting resistance.

These fluctuations in cutting resistance are inputted as disturbance vibrations to a rotation control system of a spindle or a feed control system of a feed device of a machine tool. To achieve machining with stable quality, the control system is required to be stable in control against these disturbance vibrations. The inventors of the present disclosure initially thought that tool wear could be reduced by increasing stabilization of the control system against disturbance vibration.

Thus, with the aim of stabilizing the control system of a rotation drive motor which rotates a spindle or a feed drive motor of a feed device in intermittent cutting, the inventors of the present disclosure investigated influences on tool wear while widening the frequency response band of the control system in a stepwise manner.

As a result, it was found that the frequency response band and tool wear of the control system in intermittent cutting have a non-linear correlation.

The disclosure was made in the background described above, and has an object of providing a machining method capable of reducing tool wear in intermittent cutting.

Solution to Problem

To achieve the objects described above, the present disclosure relates to:

a method of machining a workpiece by intermittent cutting with a machine tool including a rotation drive motor which relatively rotates a tool and the workpiece and a feed drive motor which relatively moves the tool and the workpiece on a two-dimensional plane or in a three-dimensional space, wherein the workpiece is machined by setting a frequency response band of at least one of a control system for the rotation drive motor and a control system for the feed drive motor at a frequency response band at which tool wear is within a predetermined allowable range.

As described above, the inventors of the present disclosure investigated influences on tool wear in intermittent cutting while widening the frequency response band of the control system of the rotation drive motor or the feed drive motor. As a result, it was found that frequency response bands and tool wear of the control system have a non-linear correlation. More specifically, in the correlation between the frequency response band and tool wear, tool wear is minimum in a predetermined frequency response band. If the frequency response band is widened more, tool wear is increased. Conversely, even if the frequency response band is narrowed more, tool wear is increased.

Therefore, the workpiece is machined with the frequency response band set at a frequency response band in which tool wear is within a predetermined allowable range. With this, tool wear can be made within the predetermined allowable range, thereby stabilizing machining quality and improving machining efficiency.

In the control system, as the frequency response band is wider, stability against disturbance fluctuations is higher. Therefore, the frequency response band is preferably set as wide as possible within the allowable range of tool wear.

The frequency response band in which tool wear is within the allowable range can be set from a correlation experimentally found between the frequency response band and tool wear of the control system of the drive motor.

As described above, in the correlation between the frequency response band and tool wear, tool wear is minimum in a predetermined frequency response band. Tool wear is increased when the frequency response band is widened more and, conversely, even if the frequency response band is narrowed more, tool wear is increased. Thus, to clarify the reason for this phenomenon, the inventors of the present disclosure investigated a relation between the frequency response band and a rotation speed and an output torque of the drive motor. As known, the output torque of the drive motor and the current supplied to the drive motor have a proportional relation, and can be thought to be equivalent to each other. Therefore, in the present disclosure, the output torque and the supplied current are regarded as equivalent to each other. While only the output torque will be described in the following description, the output torque can be replaced by the supplied current.

As a result of the investigation, regarding the relation between frequency response bands and rotation speeds, it was found that fluctuations in rotation speed are increased as the frequency response band is narrowed more and fluctuations in rotation speed are decreased as the frequency response band is widened more. These fluctuations in rotation speed lead to fluctuations in cutting resistance in both cases of the rotation drive motor and the feed drive motor, and an influence on tool wear is speculated. It is considered that tool wear is increased as the frequency response band is narrowed more.

On the other hand, regarding the relation between the frequency response band and output torque, it was found that fluctuations in output torque are decreased as the frequency response band is narrowed more and fluctuations in output torque are increased as the frequency response band is widened more. These fluctuations in output torque also lead to fluctuations in cutting resistance in both cases of the rotation drive motor and the feed drive motor, and an influence on tool wear is speculated. In combination with the results described above, it is considered that tool wear is increased as the frequency response band is widened more.

From the background as described above, the correlation between the frequency response band and tool wear is considered to be such that tool wear is minimized in a predetermined frequency response band, tool wear is increased when the frequency response band is widened more than the predetermined frequency response band, and tool wear is also increased even when the frequency response band is narrowed more.

Therefore, in consideration of the above, the frequency response band in which tool wear is within the allowable range can be set from a correlation between the frequency response band and the output torque and a correlation between the frequency response band and a rotation speed. By setting the frequency response band from the correlation between the output torque and the rotation speed, tool wear can be within the allowable range even in intermittent cutting, thereby stabilizing machining quality and improving machining efficiency.

From the background described above, an upper limit of the set range of the frequency response band is preferably set based on the correlation between the frequency response band and the output torque, and a lower limit of the set range of the frequency response band is preferably set based on the correlation between the frequency response band and the rotation speed.

Also, the upper limit may be set based on the correlation between the frequency response band and a fluctuation width of the output torque, and the lower limit may be set based on the correlation between the frequency response band and a fluctuation width of the rotation speed.

Furthermore, the upper limit is preferably set at a frequency response band at which the fluctuation width of output torque is within a range equal to or lower than +15% of a theoretical value required for cutting, and the lower limit is preferably set at a frequency response band at which the fluctuation width of rotation speed is within a range of ±15 rpm of a target rotation speed. If each fluctuation width deviates from the range, tool wear exceeds the predetermined allowable range, and this is not preferable.

Advantageous Effects

As described in detail above, according to the present disclosure, tool wear caused by fluctuations in cutting resistance inevitably occurring under intermittent cutting can be reduced, thereby stabilizing machining quality and improving machining efficiency.

DETAILED DESCRIPTION

Figure 1:
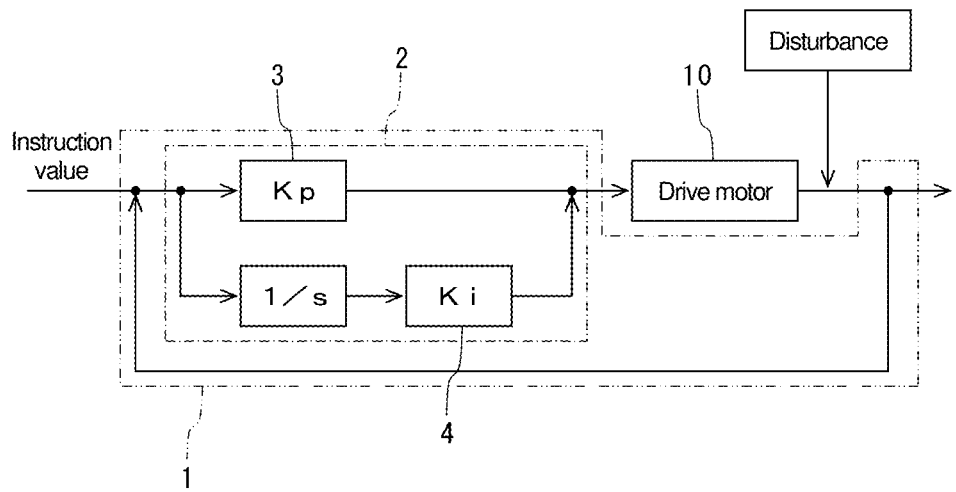
FIG. 1 is a block diagram of a general feedback control model in a rotation drive motor configuring a spindle device or a feed drive motor configuring a feed device in a machine tool.

Specific embodiments of the present disclosure are described below. FIG. 1 is a block diagram of a general feedback control model in a rotation drive motor configuring a spindle device or a feed drive motor configuring a feed device in a machine tool.

In FIG. 1, a reference numeral 10 denotes a drive motor corresponding to the rotation drive motor or the feed drive motor. A feedback control unit (a control system) 1 includes a PI control unit 2, generating a control signal corresponding to an instruction value and controlling the drive motor 10 with the generated control signal.

Figure 2:
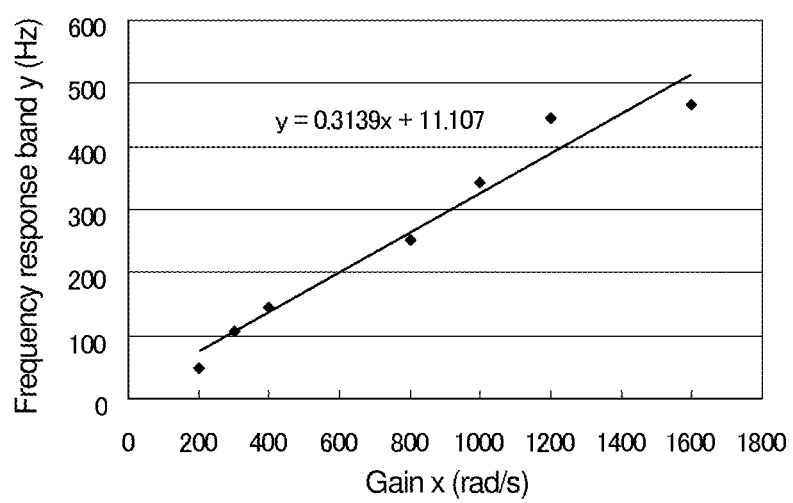
FIG. 2 is a graph of a relation between gain and frequency response band in a control system.

In the PI control unit 2, by adjusting a proportional gain 3 and an integral gain 4 (which are hereinafter simply referred to as "gain"), the frequency response band of the feedback control unit 1 can be adjusted. A relation between gain and frequency response band is depicted in FIG. 2. FIG. 2 depicts a relation between gain and frequency response band of a permanent magnet synchronous motor with a rating of 25 kW. In PI control, the frequency response speed is proportional to the magnitudes of a proportional gain Kp and an integral gain Ki and inversely proportional to the magnitude of inertia (JM+JL) of a spindle rotor. Since the inertia of the spindle rotor is constant, the frequency response band can be adjusted by changing the magnitudes of the proportional gain Kp and the integral gain Ki. The relation between gain and frequency response band can be calculated from a computational expression as appropriate, and can also be found experimentally.

As depicted in FIG. 2, the correlation between gain and frequency response band is linear. As the gain is increased more, the frequency response band can be widened more. As the band is wider, the control system is more stable against disturbance in a wide frequency range. Therefore, as the gain is increased to widen the frequency response band more, the control system is more stabilized. The frequency response band is a frequency range in which a deviation of a gain value or a loss value from a value at a reference frequency (a set frequency or a frequency at which the gain or loss is maximum) is within a defined limitation (for example, 3 dB) when the frequency is changed.

Cutting Experiment

By using a vertical machining center using the drive motor 10 with the characteristics described above as a spindle drive motor, a cutting experiment was performed with the gain being adjusted to appropriately change the frequency response band.

Figure 3:
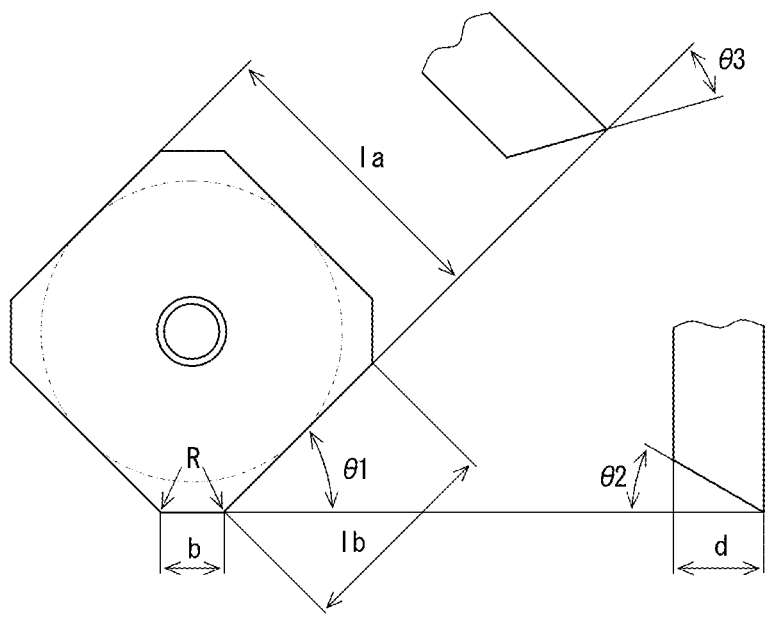
FIG. 3 is a descriptive diagram of a throw-away chip used in a cutting experiment.
Figure 4:
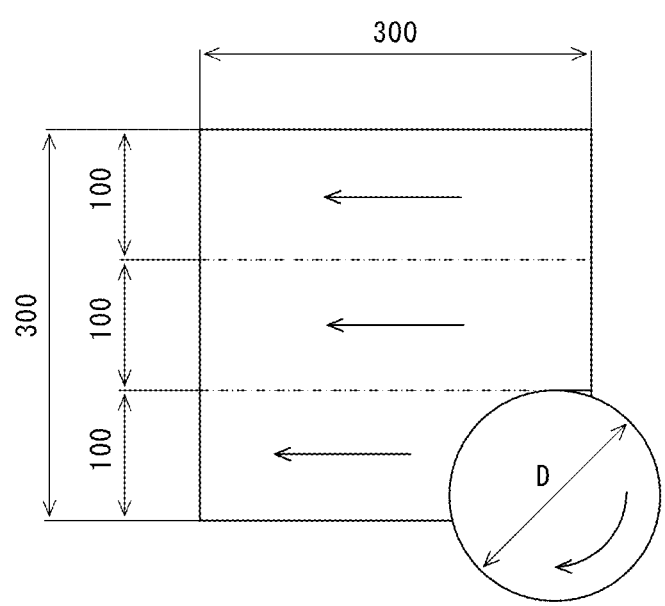
FIG. 4 is a diagram for describing a cutting method in the cutting experiment.

As a tool, a face mill manufactured by Sandvik AB and having six blades and a cutting effective diameter (D depicted in FIG. 4) of 160 mm was used. As a throw-away chip configuring a cutting blade, a CVD-coated chip having dimensions of b, d, R, $1a$, $1b$, $\theta1$, $\theta2$, and $\theta3$ depicted in FIG. 3 as follows was used: b=1.5 mm, d=6.1 mm, R=1 mm, $1a$=18 mm, $1b$=13.9 mm, $\theta1$=45°, $\theta2$=29°, and $\theta3$=20°

By using this tool, a carbon steel having a length of 300 mm, a width of 300 mm, and a thickness of 200 mm was taken as a workpiece, and the gain was adjusted so that the frequency response band was set in six stages: 50 Hz (gain=120 rad/s), 75 Hz (gain=200 rad/s), 100 Hz (gain=280 rad/s), 200 Hz (gain=600 rad/s), 300 Hz (gain=920 rad/s), and 470 Hz (gain=1600 rad/s). Dry cutting was performed in each of the set frequency response band.

The cutting conditions were as follows. The rotation speed of the tool, that is, a spindle, was set at 500 rpm (therefore, the cutting speed was 251 m/min), the feed speed of the tool was set at 1470 mm/min (therefore, the depth of cut amount (cutting amount) in a feed direction per one blade of the cutting blades was 0.49 mm), and the incision amount in a thickness direction of the tool was set at 3 mm. Also, the tool was rotated in an arrow direction in FIG. 4, its cutting width was set at 100 mm, and cutting was performed by moving the tool in directions indicated by arrows depicted in FIG. 4. Cutting under these conditions is intermittent cutting at a cutting frequency of 50 Hz, and the theoretical cutting torque (the output torque of the drive motor 10) is approximately 330 Nm.

An output torque of the drive motor 10 and a rotation speed of the spindle were measured during machining at each frequency response band described above, and a wear amount of the throw-away chip after machining was measured. The results are depicted in FIGS. 5-29.

As known, a current supplied to the drive motor 10 (a motor q-axis current iqs) and its output torque T have a proportional relation that can be represented by the following equation:

$$T=\phi \times iqs,$$

where $\phi$ is a motor constant.

Therefore, in the experiment, the current supplied to the drive motor 10 was measured, and an output torque of the drive motor 10 was calculated from the computational expression mentioned above.

Figure 5:
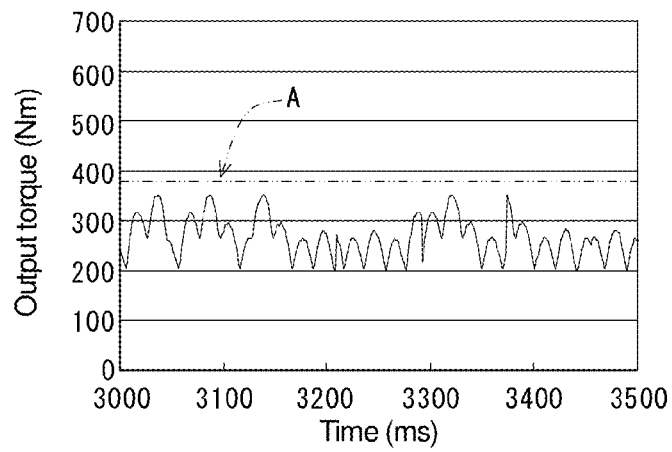
FIG. 5 is a graph of output torque of the drive motor when the frequency response band is 50 Hz.
Figure 6:
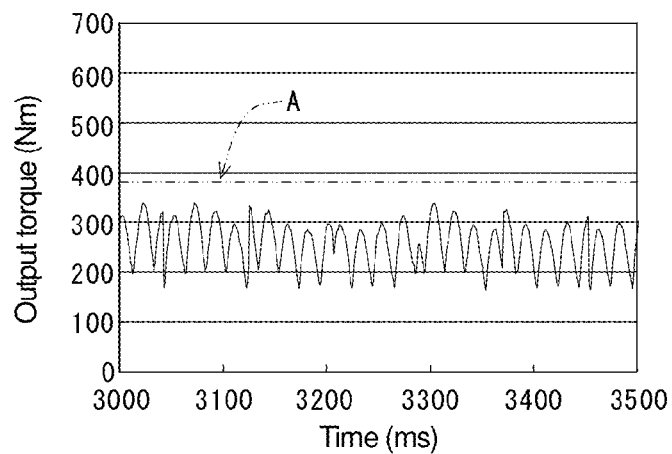
FIG. 6 is a graph of output torque of the drive motor when the frequency response band is 75 Hz.
Figure 7:
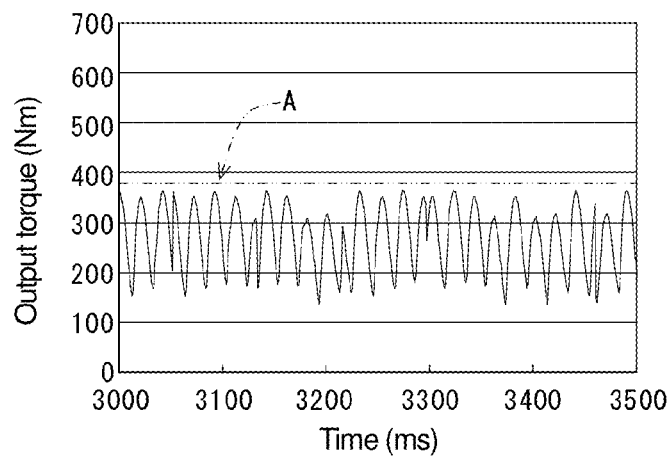
FIG. 7 is a graph of output torque of the drive motor when the frequency response band is 100 Hz.
Figure 8:
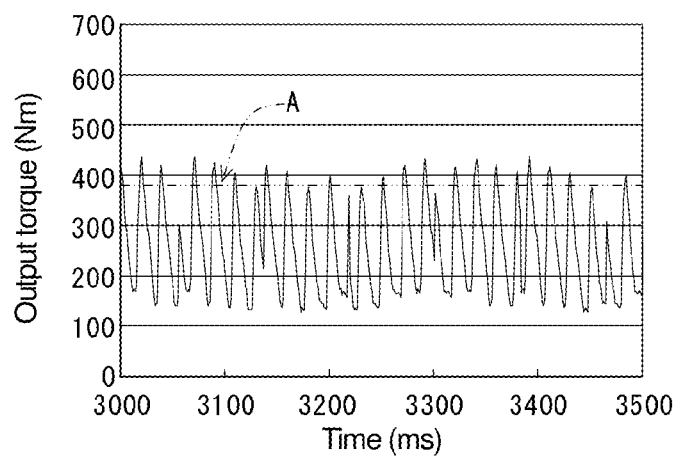
FIG. 8 is a graph of output torque of the drive motor when the frequency response band is 200 Hz.
Figure 9:
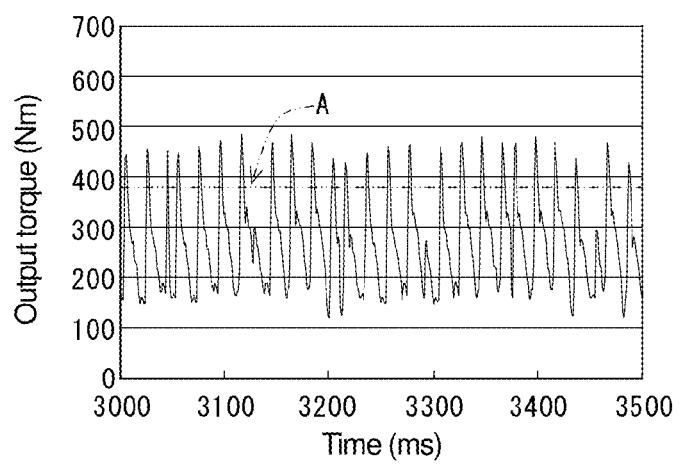
FIG. 9 is a graph of output torque of the drive motor when the frequency response band is 300 Hz.
Figure 10:
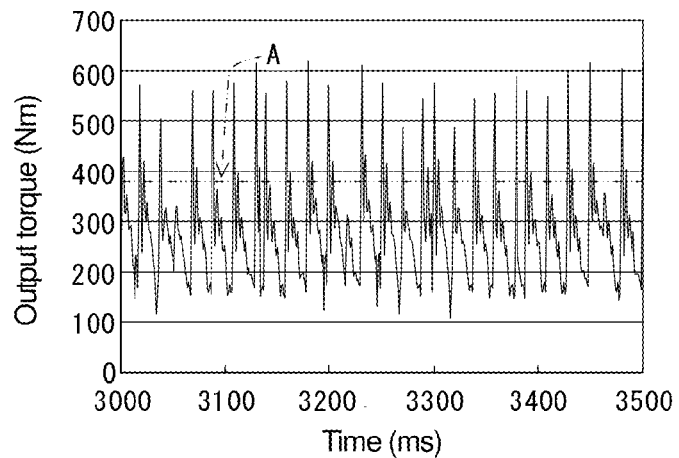
FIG. 10 is a graph of output torque of the drive motor when the frequency response band is 470 Hz.

FIGS. 5-10 are graphs of output torque of the drive motor 10. FIG. 5 depicts output torque when the frequency response band is 50 Hz. FIG. 6 depicts output torque when the frequency response band is 75 Hz. FIG. 7 depicts output torque when the frequency response band is 100 Hz. FIG. 8 depicts output torque when the frequency response band is 200 Hz. FIG. 9 depicts output torque when the frequency response band is 300 Hz. FIG. 10 depicts output torque when the frequency response band is 470 Hz.

Figure 11:
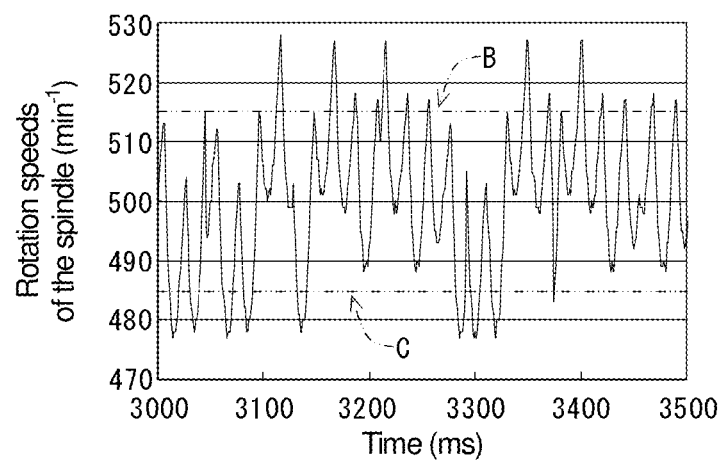
FIG. 11 is a graph of output torque of a spindle when the frequency response band is 50 Hz.
Figure 12:
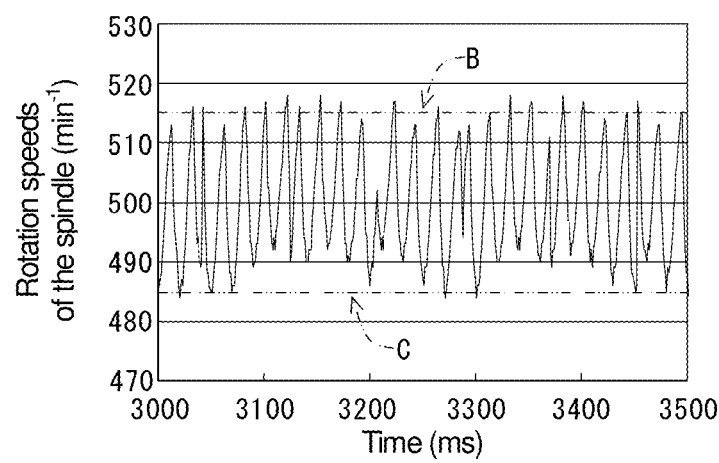
FIG. 12 is a graph of output torque of the spindle when the frequency response band is 75 Hz.
Figure 13:
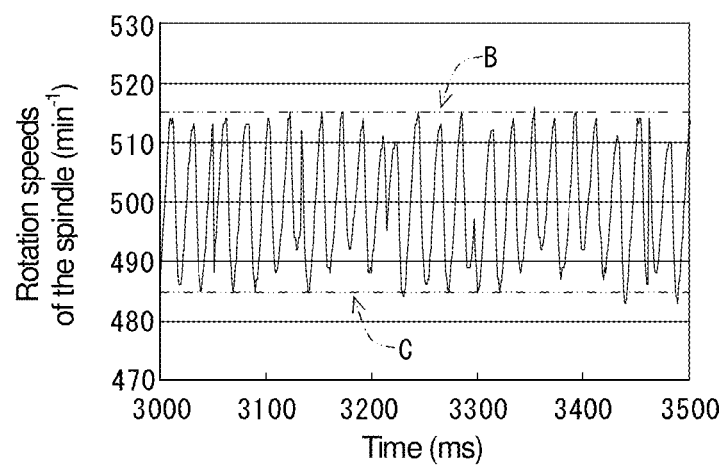
FIG. 13 is a graph of output torque of the spindle when the frequency response band is 100 Hz.
Figure 14:
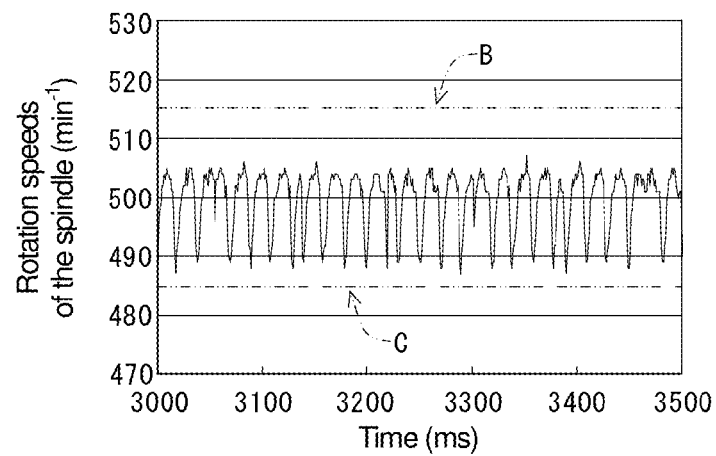
FIG. 14 is a graph of output torque of the spindle when the frequency response band is 200 Hz.
Figure 15:
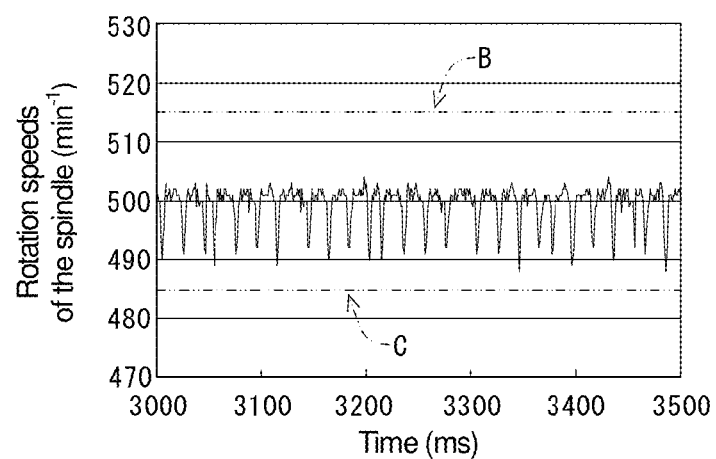
FIG. 15 is a graph of output torque of the spindle when the frequency response band is 300 Hz.
Figure 16:
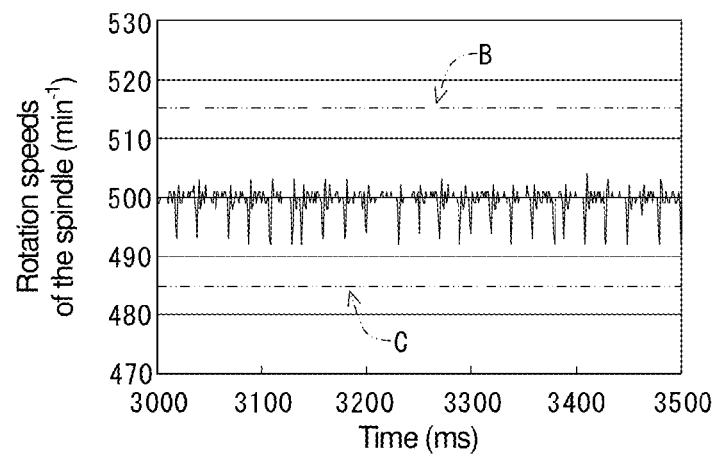
FIG. 16 is a graph of output torque of the spindle when the frequency response band is 470 Hz.

FIGS. 11-16 are graphs of rotation speeds of the spindle. FIG. 11 depicts rotation speeds of the spindle when the frequency response band is 50 Hz. FIG. 12 depicts rotation speeds of the spindle when the frequency response band is 75 Hz. FIG. 13 depicts rotation speeds of the spindle when the frequency response band is 100 Hz. FIG. 14 depicts rotation speeds of the spindle when the frequency response band is 200 Hz. FIG. 15 depicts rotation speeds of the spindle when the frequency response band is 300 Hz. FIG. 16 depicts rotation speeds of the spindle when the frequency response band is 470 Hz.

Figure 17:
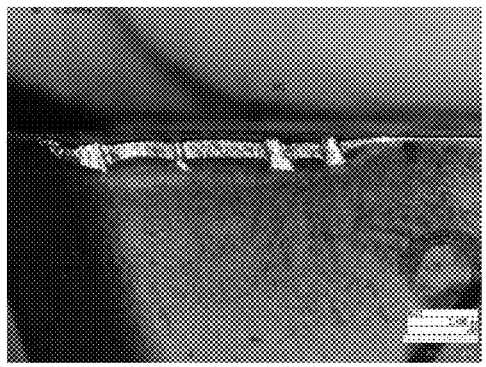
FIG. 17 is a photograph of a flank of a throw-away chip when the frequency response band is 50 Hz.
Figure 18:
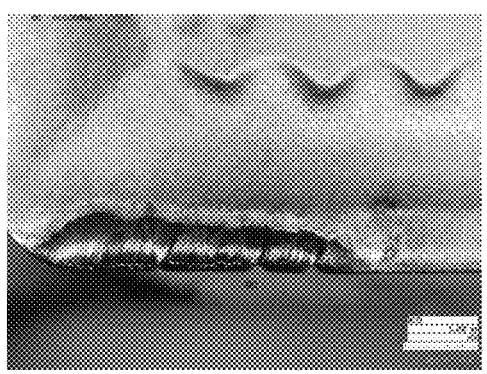
FIG. 18 is a photograph of a cutting face of the throw-away chip when the frequency response band is 50 Hz.
Figure 19:
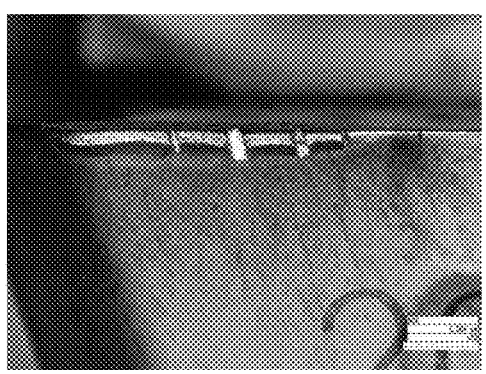
FIG. 19 is a photograph of the flank of a throw-away chip when the frequency response band is 75 Hz.
Figure 20:
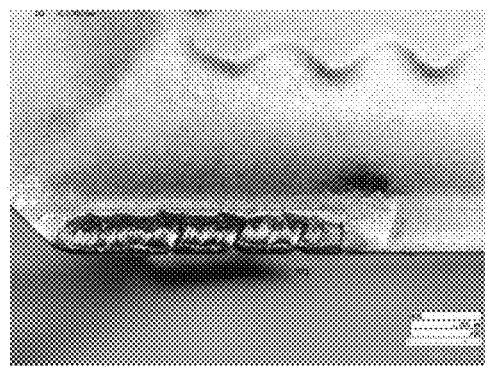
FIG. 20 is a photograph of the cutting face of the throw-away chip when the frequency response band is 75 Hz.
Figure 21:
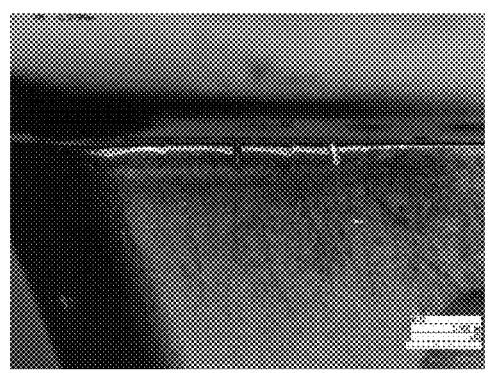
FIG. 21 is a photograph of the flank of a throw-away chip when the frequency response band is 100 Hz.
Figure 22:
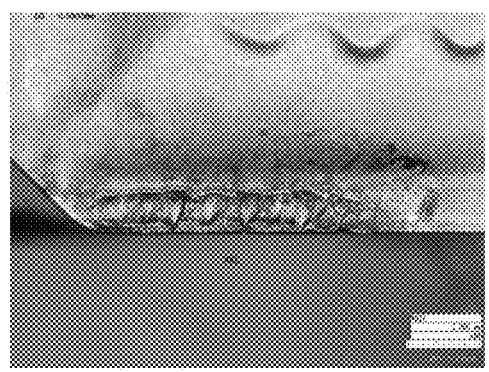
FIG. 22 is a photograph of the cutting face of the throw-away chip when the frequency response band is 100 Hz.
Figure 23:
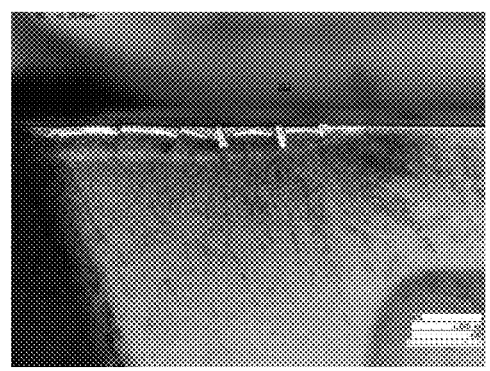
FIG. 23 is a photograph of the flank of a throw-away chip when the frequency response band is 200 Hz.
Figure 24:
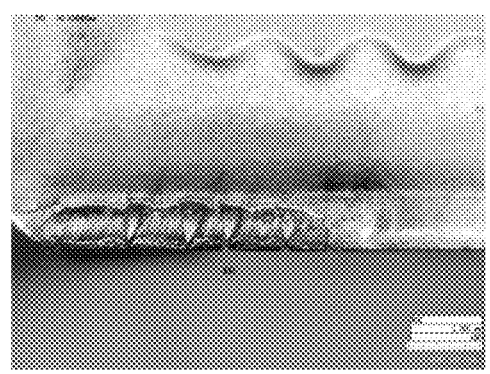
FIG. 24 is a photograph of the cutting face of the throw-away chip when the frequency response band is 200 Hz.
Figure 25:
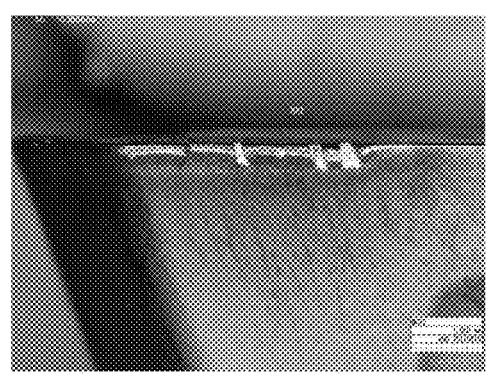
FIG. 25 is a photograph of the flank of a throw-away chip when the frequency response band is 300 Hz.
Figure 26:
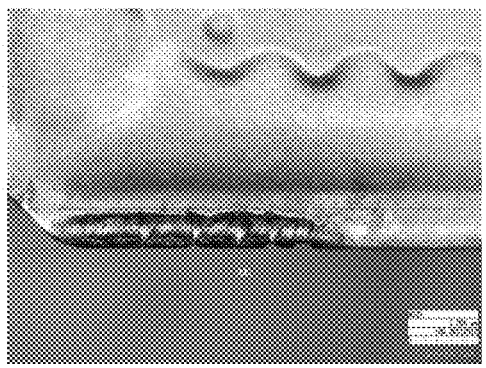
FIG. 26 is a photograph of the cutting face of the throw-away chip when the frequency response band is 300 Hz.
Figure 27:
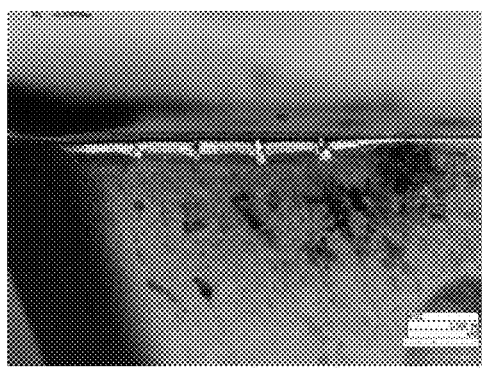
FIG. 27 is a photograph of the flank of a throw-away chip when the frequency response band is 470 Hz.
Figure 28:
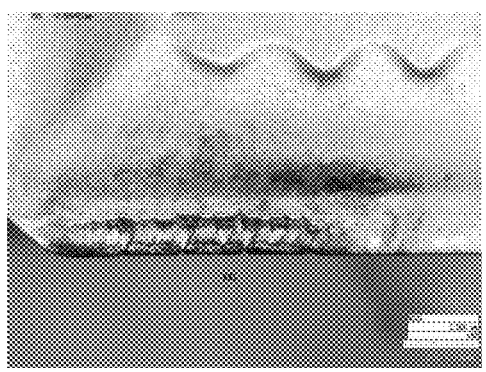
FIG. 28 is a photograph of the cutting face of the throw-away chip when the frequency response band is 470 Hz.

FIGS. 17-28 are photographs of a cutting edge of the throw-away chip when the cutting length is 16200 mm. FIG. 17 is a photograph of a flank of the throw-away chip when the frequency response band is 50 Hz, and FIG. 18 is a photograph of a cutting face thereof. FIG. 19 is a photograph of the flank of the throw-away chip when the frequency response band is 75 Hz, and FIG. 20 is a photograph of the cutting face thereof. FIG. 21 is a photograph of the flank of the throw-away chip when the frequency response band is 100 Hz, and FIG. 22 is a photograph of the cutting face thereof. FIG. 23 is a photograph of the flank of the throw-away chip when the frequency response band is 200 Hz, and FIG. 24 is a photograph of the cutting face thereof. FIG. 25 is a photograph of the flank of the throw-away chip when the frequency response band is 300 Hz, and FIG. 26 is a photograph of the cutting face thereof. FIG. 27 is a photograph of the flank of the throw-away chip when the frequency response band is 470 Hz, and FIG. 28 is a photograph of the cutting face thereof.

Figure 29:
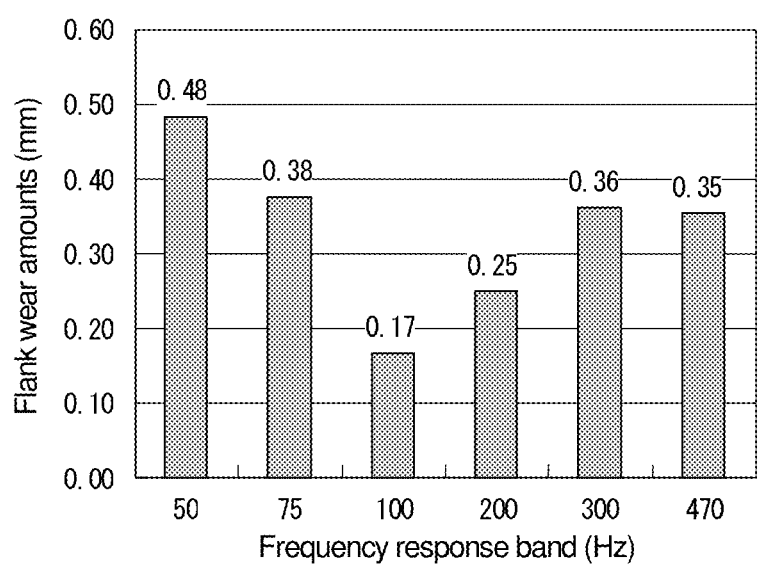
FIG. 29 is a graph of a relation between wear amounts and frequency response bands of the flank of the throw-away chip.

FIG. 29 is a graph of flank wear amounts measured from the respective photographs of FIGS. 17, 19, 21, 23, 25, and 27 in relation to the frequency response bands.

Consideration of Cutting Experiment

1. Relation Between Output Torque and Tool Wear

As depicted in FIGS. 5-10, the output torque of the drive motor 10 has a tendency of fluctuations to be smaller as the frequency response band of the control system is narrower and to be larger as the frequency response band is widened. The reason for this can be thought as follows. In intermittent cutting, the cutting blade is intermittently brought into contact with a workpiece. When the cutting blade in a non-contact state is brought into contact with the workpiece for starting cutting, a cutting resistance is abruptly acted on the cutting blade. Therefore, in the state in which the gain of the control system is increased to improve responsiveness, a current to be applied to the drive motor 10 is abruptly increased so as to follow an abrupt load fluctuation, thereby abruptly increasing (fluctuating) the output torque.

This increase of the output torque is larger than a torque required for cutting. With this torque applied to the cutting blade, an impact stress due to a contact between the cutting blade and the workpiece is increased. Accordingly, cutting heat is also increased, and therefore wear of the cutting blade is through to be promoted. As such, in view of fluctuations in output torque, tool wear is increased as the gain of the control system is increased to widen the frequency response band more. Conversely, it can be thought that tool wear is decreased as the gain of the control system is decreased to narrow the frequency response band more.

2. Relation Between Rotation Speed and Tool Wear

On the other hand, as depicted in FIGS. 11-16, the rotation speed of the spindle has a tendency of fluctuations to be larger as the frequency response band of the control system is narrower and to be smaller as the frequency response band is widened. As described above, in intermittent cutting, the cutting blade is intermittently brought into contact with a workpiece. When the cutting blade in a non-contact state is brought into contact with the workpiece for starting cutting, cutting resistance is abruptly acted on the cutting blade. Therefore, in the state in which the gain of the control system is decreased to degrade responsiveness, an abrupt load fluctuation is not followed well, resulting in a large fluctuation in the rotation speed of the spindle. On the other hand, if the gain of the control system is increased to improve responsiveness, an abrupt load fluctuation is followed well, and fluctuations in rotation speed of the spindle can be suppressed.

When the rotation speed of the spindle is fluctuated, the cutting resistance to be acted on the cutting blade is fluctuated, thereby fluctuating a stress to be acted on the cutting blade and also fluctuating cutting heat to be generated. These fluctuations are thought to adversely affect wear of the cutting blade. As such, in view of fluctuations in rotation speed of the spindle, it can be thought that tool wear is increased as the gain of the control system is decreased to narrow the frequency response band and, conversely, tool wear is decreased as the gain of the control system is increased to widen the frequency response band.

3. Relation Between Frequency Response Band and Tool Wear

As such, when the gain of the control system is adjusted to change the frequency response band, a tool wear phenomenon thought to be caused by fluctuations in output torque of the drive motor 10 and a tool wear phenomenon thought to be caused by fluctuations in rotation speed of the spindle are contradictory.

Therefore, from this background, practical tool wear occurs with fluctuations in output torque and fluctuations in rotation speed of the spindle overlapping each other. As depicted in FIG. 29, tool wear is minimum (0.17 mm) at a predetermined frequency response band (100 Hz in this experiment). If the frequency response band is widened more, tool wear is increased. Conversely, even if the frequency response band is narrowed more, tool wear is increased. Specifically, tool wear is 0.25 mm when the frequency response band is 200 Hz, tool wear is 0.36 mm when the frequency response band is 300 Hz, tool wear is 0.35 mm when the frequency response band is 400 Hz. On the other hand, tool wear is 0.38 mm when the frequency response band is 75 Hz, tool wear is 0.48 mm when frequency response band is 50 Hz.

4. Conclusion

As such, by adjusting the gain of the control system to perform machining with varied frequency response bands to find a correlation between the frequency response band and tool wear, an optimum frequency response band in which tool wear is minimized can be found. By setting the frequency response band of the control system at an optimum frequency response band, tool wear can be suppressed to be minimum, thereby stabilizing machining quality and improving machining efficiency.

A practically allowable tool wear amount should be empirically determined in consideration of stability of quality and machining cost. In this sense, the frequency response band may be set at a value at which tool wear is within the allowable range. A correlation between tool wear within the allowable range and frequency response band can be empirically found through the experiment described above.

As evident from the experiment described above, the frequency response band of the control system 1 and the output torque of the drive motor 10 have a predetermined correlation, and the frequency response band and the rotation speed of the drive motor 10 (the spindle) have a predetermined correlation. Therefore, the frequency response band in which tool wear is within the allowable range can be found from the correlation between the frequency response band and the output torque and the rotation speed.

In consideration of a tendency of the fluctuations in output torque to increase as the frequency response band is widened more, thereby increasing tool wear and a tendency of the fluctuations in rotation speed to increase as the frequency response band is narrowed more, thereby increasing tool wear, an upper limit of the allowable frequency response band can be set from the correlation with the output torque (or its fluctuation width), and a lower limit of the allowable frequency response band can be set from the correlation with the rotation speed (or its fluctuation width) of the spindle.

Furthermore, from the experimental results described above, the upper limit of the frequency response band is preferably set at a frequency response band so that the fluctuation width of the output torque is within a range equal to or lower than +15% of a theoretical value required for cutting, and the lower limit is preferably set at a frequency response band in which the fluctuation width of the rotation speed is within a range of ±15 rpm of a target rotation speed.

An A line depicted in each of FIGS. 5-10 is a line indicating 379.5 Nm obtained by multiplying a theoretical torque of 330 Nm required for cutting by 1.15. A B line depicted in each of FIGS. 11-16 is a line indicating 515 rpm obtained by adding 15 rpm to the target rotation speed of 500 rpm, and a C line depicted therein is a line indicating 485 rpm obtained by subtracting 15 rpm from the target rotation speed of 500 rpm. Therefore, in the examples of FIGS. 5-16, an allowable frequency response band has an upper limit of 200 Hz and a lower limit of 75 Hz.

In the control system 1, as the frequency response band is wider, stability against disturbance fluctuations is higher. Therefore, the frequency response band is preferably set at a wide value in the allowable range.

While the specific embodiments of the present disclosure have been described above, they do not restrict specific modes included in the present disclosure.

For example, as described above, the output torque and the supplied current of the drive motor 10 have a predetermined proportional relation. Therefore, in place of the output torque, the frequency response band to be set may be set from the correlation between the frequency response band of the control system and the current supplied to the drive motor 10.

Also, while the current supplied to the drive motor 10 is measured to calculate an output torque from the measured supplied current in the experiment described above, this is not meant to be restrictive. An output torque of the drive motor 10 may be directly measured.

Furthermore, while the method of setting the frequency response band of the control of the drive motor for rotating the spindle has been described in the experimental example described above, a drive motor influencing tool wear is not restrictive. Also for a feed drive motor which relatively moves a tool and workpiece on a two-dimensional plane or in a three-dimensional space, a similar method can be used to set a frequency response band of the control system of the feed drive motor, thereby reducing tool wear in intermittent cutting.

Still further, while the machining center was used as a machine tool in the experimental example described above, a machine tool to which the present disclosure can be applied is not restricted to this, and includes a machine tool in general including a rotation drive motor, such as a lathe, which relatively rotates a tool and a workpiece and a feed drive motor which relatively moves the tool and the workpiece on a two-dimensional plane or in a three-dimensional space.

Still further, while the control system 1 for use includes the PI control unit 2 in the experiment, this is not meant to be restrictive, and the control system 1 may include a PID control unit. Also in this case, the frequency response band of the control system 1 can be adjusted by adjusting each of the proportional gain, the integral gain, and a differential gain.

Still further, the method of adjusting the frequency response band is not restricted to the gain-adjusting method, and the frequency response band can be adjusted by another method.

What is claimed is:

1. A method of machining a workpiece by intermittent cutting with a machine tool including a rotation drive motor which relatively rotates a tool and the workpiece and a feed drive motor which relatively moves the tool and the workpiece on a two-dimensional plane or in a three-dimensional space, the method comprising:
previously obtaining a correlation between abrasion of the tool and a frequency response band of at least one of a feedback control unit controlling an operation of the rotation drive motor and a feedback control unit controlling an operation of the feed drive motor, the correlation being such that the abrasion of the tool has a minimum value when the frequency response band is a predetermined reference frequency response band, and the abrasion of the tool increases as the frequency response band becomes wider relative to the reference frequency response band and also increases as the frequency response band becomes narrower relative to the reference frequency response band; and
machining the workpiece by setting, based on the obtained correlation, the frequency response band of a corresponding feedback control unit so that the abrasion of the tool is within a predetermined allowable range.

2. A method of machining a workpiece by intermittent cutting with a machine tool including a rotation drive motor which relatively rotates a tool and the workpiece and a feed drive motor which relatively moves the tool and the workpiece on a two-dimensional plane or in a three-dimensional space, the method comprising:
previously obtaining a correlation between a frequency response band of at least one of a feedback control unit controlling an operation of the rotation drive motor and a feedback control unit controlling an operation of the feed drive motor, and a fluctuation width of an output torque of a corresponding drive motor or a fluctuation width of a current supplied to the corresponding drive motor and a correlation between the frequency response band of the at least one of the feedback control units and a fluctuation width of a rotation speed of the corresponding drive motor, the correlation between the frequency response band and the fluctuation width of the output torque or the fluctuation width of the supplied current being such that the fluctuation width of the output torque or the fluctuation width of the supplied current decreases as the frequency response band becomes narrower and the fluctuation width of the output torque or the fluctuation width of the supplied current increases as the frequency response band becomes wider, the correlation between the frequency response band and the fluctuation width of the rotation speed of the drive motor being such that the fluctuation width of the rotation speed increases as the frequency response band becomes narrower and the fluctuation width of the rotation speed decreases as the response frequency band becomes wider; and
setting, based on the obtained correlations, the frequency response band of a corresponding feedback control unit so that the abrasion of the tool is within a predetermined allowable range.

3. The method of claim 2, wherein:
an upper limit of the set frequency response band is set based on the correlation between the frequency response band of the corresponding feedback control unit and the fluctuation width of the output torque of the drive motor corresponding to the feedback control unit or the correlation between the frequency response band of the corresponding feedback control unit and the fluctuation width of the current supplied to the drive motor corresponding to the feedback control unit; and
a lower limit of the set frequency response band is set based on the correlation between the frequency response band of the corresponding feedback control unit and the fluctuation width of the rotation speed of the drive motor corresponding to the feedback control unit.

4. The method of claim 3, wherein:
the upper limit of the set frequency response band comprises a first frequency response band at which the fluctuation width of the output torque or the fluctuation width of the supplied current is within an upper limit range less than or equal to +15% of a theoretical value required for cutting; and
the lower limit of the set frequency response band comprises a second frequency response band at which the fluctuation width of the rotation speed is within a lower limit range of ±15 rpm of an instructed rotation speed.

\* \* \* \* \*